Patented Dec. 9, 1924.

1,518,182

UNITED STATES PATENT OFFICE.

GEORGE O. CURME, JR., OF CLENDENIN, WEST VIRGINIA, ASSIGNOR TO CARBIDE & CARBON CHEMICALS CORPORATION, A CORPORATION OF NEW YORK.

PROCESS OF MAKING ALKYL CHLORIDES.

No Drawing.   Application filed May 17, 1922.   Serial No. 561,715.

*To all whom it may concern:*

Be it known that I, GEORGE O. CURME, Jr., a citizen of the United States, residing at Clendenin, West Virginia, have invented certain new and useful Improvements in Processes of Making Alkyl Chlorides, of which the following is a specification.

This invention relates to the production of alkyl chlorides.

Alkyl chlorides, especially those corresponding to the simpler alkyl groups, such as ethyl and isopropyl chlorides, are volatile, non-corrosive liquids of agreeable odor, having a high solvent power for oils, fats and many other substances. They are useful for many purposes, for example as solvents, as alkylating agents, and as refrigerants.

Heretofore, these compounds have been prepared by methods which lack simplicity and cheapness. For example, ethyl chloride is now prepared by heating ethyl alcohol with aqueous hydrochloric acid in an autoclave, or in the presence of calcium chloride. Aqueous hydrochloric acid is very corrosive to most metals, so that a costly apparatus is required.

I have now discovered a method by which alkyl chlorides may be obtained by the union of olefines with hydrochloric acid. The reaction may be carried out under anhydrous conditions, preventing corrosion of metals by the acid.

Isopropyl chloride is formed in this way with great facility, the reacting materials being merely brought into contact. Anhydrous gaseous materials may be used, and in this case, an increased pressure in the reaction vessel is desirable, as the yield of chloride is thereby improved and the capacity of an apparatus of given size is increased. Subjecting the mixed gases in approximately their combining proportions to a pressure of 15 atmospheres has given good yields and heating is unnecessary, though not precluded.

Ethylene does not combine with hydrochloric acid as readily as propylene, and with ethylene high pressures or the presence of a catalyst are required if any substantial yield is to be obtained. Pressures up to 160 atmospheres, without a catalyst, and aluminum chloride as a catalyst, without pressure, have each been tried. In either case ethyl chloride is produced in substantial quantity.

The best method for producing ethyl chloride employs both a catalyst and pressure. In the presence of aluminum chloride and at pressures no higher than 35 atmospheres, commercial yields are obtainable, even at room temperature.

When working under anhydrous conditions, any of the reacting materials which fail to combine may be separated from the desired product with the greatest facility because of the great difference in volatility. No substances corrosive to metals are present at any stage, and iron apparatus may be used.

No special form of apparatus is required for carrying out the process. The invention is not limited to a reaction between the vapor phases of the combining substance as these may react in solution. The solvent employed may be the reaction product, or other suitable solvent, preferably anhydrous.

I claim:—

1. Process of making alkyl chlorides which comprises causing hydrochloric acid to react on olefines under anhydrous conditions and under superatmospheric pressure.

2. Process of making alkyl chlorides which comprises causing hydrochloric acid to react on olefines under anhydrous conditions and superatmospheric pressure, and in the presence of aluminum chloride.

3. Process of making ethyl chloride which comprises causing anhydrous hydrochloric acid to react on ethylene, under superatmospheric pressure and in the presence of aluminum chloride.

In testimony whereof, I affix my signature.

GEORGE O. CURME, JR.